United States Patent
Masip et al.

(10) Patent No.: US 6,513,967 B2
(45) Date of Patent: Feb. 4, 2003

(54) SAFETY DEVICE FOR A JUG BLENDER

(75) Inventors: Josep-Maria Masip, Sant Cugat del Vallés (ES); Jose Luis Roman, Sant Just Desvern (ES); Robert Rafols, Sant Fost de Campcentelles (ES); Mariano Peñaranda, Barcelona (ES)

(73) Assignee: Braun GmbH (DE)

( * ) Notice: Subject to any disclaimer, the term of this patent is extended or adjusted under 35 U.S.C. 154(b) by 0 days.

(21) Appl. No.: 09/954,741

(22) Filed: Sep. 17, 2001

(65) Prior Publication Data

US 2002/0012288 A1 Jan. 31, 2002

Related U.S. Application Data

(63) Continuation of application No. PCT/EP00/02126, filed on Mar. 10, 2000.

(30) Foreign Application Priority Data

Mar. 22, 1999 (DE) ........................................ 199 12 750

(51) Int. Cl.[7] .............................................. A47J 43/046
(52) U.S. Cl. ........................ 366/205; 366/206; 241/37.5
(58) Field of Search ............................. 366/96–98, 197, 366/199, 205, 206, 314, 601; 99/348; 241/37.5

(56) References Cited

U.S. PATENT DOCUMENTS

| | | | | |
|---|---|---|---|---|
| 1,997,873 | A | * | 4/1935 | Poplawski |
| 2,284,155 | A | * | 5/1942 | Landgraf |
| 3,128,996 | A | * | 4/1964 | Kuzara |
| 3,315,946 | A | * | 4/1967 | Nissman |
| 3,612,126 | A | * | 10/1971 | Emmons et al. |

(List continued on next page.)

FOREIGN PATENT DOCUMENTS

| | | |
|---|---|---|
| DE | 29 28 107 | 1/1981 |
| DE | 38 37 961 | 5/1990 |
| EP | 0 012 976 | 7/1980 |
| EP | 257705 | * 3/1988 |
| EP | 571348 | * 11/1993 |
| EP | 638273 | * 2/1995 |
| FR | 1 327 796 | 4/1963 |
| FR | 2 769 199 | 4/1999 |
| GB | 762213 | * 11/1956 |
| GB | 1 088 019 | 10/1967 |
| GB | 1 341 180 | 12/1973 |
| GB | 2249368 | * 5/1992 |

Primary Examiner—Charles E. Cooley
(74) Attorney, Agent, or Firm—Fish & Richardson PC

(57) ABSTRACT

The invention is directed to a safety device for a jug blender that has a blender jug (10) adapted for seating engagement with a base (7) equipped with a drive motor. The safety device includes two vertically movable actuating pins (1) arranged in spaced relation to each other and projecting upwardly through the wall of the base (7), and the blender jug (10) has actuating points (11) cooperating therewith which, with the blender jug (10) properly assembled, urge the two actuating pins (1) simultaneously and evenly horizontally in downward direction in order to thus close the circuit supplying the drive motor. Any improper handling or activation of the motor with the blender jug (10) not properly positioned is avoided by connecting actuating members with the actuating pins (1) in the base (7) in such manner that a safety switch does not close unless the pins (1) are urged down evenly and at the same time horizontally.

13 Claims, 3 Drawing Sheets

U.S. PATENT DOCUMENTS

| | | | |
|---|---|---|---|
| 3,785,579 A | * | 1/1974 | Voglesonger |
| 3,786,999 A | * | 1/1974 | Cabell |
| 3,892,365 A | * | 7/1975 | Verdun |
| 4,108,054 A | * | 8/1978 | Klocker et al. |
| 4,111,372 A | * | 9/1978 | Hicks et al. |
| 4,200,240 A | * | 4/1980 | Machuron |
| 4,213,569 A | * | 7/1980 | Amiot |
| 4,216,917 A | * | 8/1980 | Clare et al. |
| 4,269,519 A | * | 5/1981 | Birr |
| 4,297,038 A | * | 10/1981 | Falkenbach |
| 4,335,860 A | * | 6/1982 | Grandel et al. |
| 4,371,118 A | * | 2/1983 | Sontheimer et al. |
| 4,373,677 A | * | 2/1983 | Kunihiro |
| 4,396,159 A | * | 8/1983 | Podell |
| 4,487,509 A | * | 12/1984 | Boyce |
| 4,506,836 A | * | 3/1985 | Williams |
| 4,629,131 A | * | 12/1986 | Podell |
| 4,691,870 A | * | 9/1987 | Fukunaga et al. |
| 4,741,482 A | * | 5/1988 | Coggiola et al. |
| 5,323,973 A | * | 6/1994 | Ferrara, Jr. |
| 5,338,111 A | * | 8/1994 | Trocherie et al. |
| 5,353,697 A | * | 10/1994 | Venturati et al. |
| 5,567,049 A | * | 10/1996 | Beaudet et al. |
| 5,639,161 A | * | 6/1997 | Sirianni |
| 5,779,358 A | | 7/1998 | Bevington |
| 5,809,872 A | * | 9/1998 | Sundquist |
| 6,112,649 A | * | 9/2000 | Jeong |
| 6,186,425 B1 | * | 2/2001 | Celso De Almeida Mattos |
| 6,209,810 B1 | * | 4/2001 | Brisard |
| 6,350,053 B1 | * | 2/2002 | Morin |
| 6,375,102 B1 | * | 4/2002 | Bouleau et al. |
| 2002/0012288 A1 | * | 1/2002 | Masip et al. |
| 2002/0071340 A1 | * | 6/2002 | Juriga |

* cited by examiner

SAFETY DEVICE FOR A JUG BLENDER

This is a continuation of application No. PCT/EP00/02126, filed Mar. 10, 2000.

This invention relates to a safety device for a jug blender that has a blender jug adapted for seating engagement with a base equipped with an electric drive motor, said safety device having actuating members inside the base as well as a safety switch actuated by said actuating members and arranged in series in a power supply line of the drive motor so that the actuating members can only close the safety switch to supply the drive motor if the blender jug is correctly mounted.

BACKGROUND

A safety device of this type is known from U.S. Pat. No. 5,779,358, for example. In this known safety device a safety switch arranged in a power supply line for a drive motor mounted in the interior of the base support is only actuated by a collar covering the lower edge of the blender jug when the blender jug is correctly mounted on the base support, which in the known case means being correctly screwed on. In this arrangement the safety switch is positioned in the base support such that it can only be actuated by the edge of the blender jug collar and accidental actuation is possible only with difficulty. Blender jugs of this type with a thread at their edge are advantageous as regards the stable connection of the blender jug with the base formed by the threaded connection. A disadvantage is the rather awkward screwing of the blender jug on and off the base, which sometimes, when the turns of thread are gummed up with blended material, may only be possible by applying high force. To eliminate this problem there have already been proposals of jug blenders in which the blender jug is connected to the base as a push-fit, in which case care must be equally taken to ensure that the safety device for supplying power to the motor can only be actuated when the blender jug has been push-fitted onto the base in the proper position.

It is therefore an object of the present invention to provide a safety device for a jug blender that reliably prevents the dangerous cutter blades from being driven by the drive motor when the blender jug has not been push-fitted onto the base at all or correctly.

SUMMARY OF THE INVENTION

In accordance with an essential aspect the safety device of the invention works by the principle that the actuating members for actuating the safety switch can be actuated separately but in unison by two actuating points arranged in spaced relation to each other on the lower edge of the blender jug, in such manner that the safety switch can only be closed when both actuating members are actuated simultaneously and evenly by the two actuating points of the blender jug, i.e., when it is properly assembled.

The application described herein concerns a jug blender that is normally operated in a horizontal working position, hence the positional terms "horizontal", "vertical", "perpendicular", "radial" and "axial" refer to the working position of the jug blender. It should be noted, however, that the safety device of the invention is sure to function in other working positions as well.

To achieve a constructional advantageous and safe solution the rocking lever is arranged for both pivotal and axial sliding motion. This ensures that the blender jug is correctly assembled only when the rocking lever is displaced horizontally, meaning that it is evenly pressed downwardly by the engagement surface of the blender jug. Only then can the appliance be switched on via the rocking switch.

The features of having the rocking lever be symmetrically shaped in longitudinal direction and having, in its center, a guide pin perpendicular to the plane of motion of the rocking lever, and the guide part having a vertical guide slot which extends parallel to the plane of motion of the rocking lever and in which the guide pin is guided with clearance result in a simple switch solution affording ease of turning and sliding. This applies equally to the features of having the rocking lever have, in its center, two mutually aligned guide pins, and the guide part having two parallel vertical walls in which two mutually aligned guide slots are provided for guiding the two guide pins.

According to the features of one embodiment, the actuating members include an elongate, normally horizontally extending rocking lever made of an insulating material whose length is adapted to the distance between the actuating points of the blender jug, said rocking lever being actuatable at each of its two ends by a respective actuating pin movable vertically within a bore in the upper wall of the base by pressure from the actuating points of the mounted blender jug, causing the lever to execute a rocking motion within a predetermined angle in the vertical plane combined with a sliding motion by a predetermined distance in vertical direction, and being for this purpose centrally guided in a guide part fastened in the base while being at the same time elastically biased in horizontal position toward the blender jug by a spring element, and the safety switch has an electrically conducting contact strip that is movable with the rocking lever, is fixed centrally to the lever bottom side facing away from the actuating pins, and projects in longitudinal direction of the rocking lever, said contact strip having a contact at each end, as well as two individual fixed contacts fastened to the base at a location opposite the contacts of the contact strip, so that the contacts of the movable contact strip can only be closed with the fixed contacts and power be supplied to the drive motor when the blender jug is seated in its proper relationship upon the base, causing, as this occurs, the actuating points of the blender jug to urge simultaneously and evenly both actuating pins, the rocking lever and the connected movable contact strip against the biasing force of the spring element horizontally downwardly into engagement with the two fixed contacts of the safety switch, at least in the end phase of the downward motion. An easy moving switch with a high level of safety and convenience is thus created with this solution.

The bilateral contact strip fastened to the bottom side of the rocking lever movable in a vertical plane thus ensures that the safety switch for supplying power to the drive motor can only be closed when the rocking lever is urged down evenly and horizontally, at least in the end phase of the downward movement, by the actuating points on the bottom edge of the blender jug. Only when this condition is satisfied is the drive motor supplied with power via the safety switch and the main switch serially connected therewith.

If anyone incorrectly actuates only one of the actuating pins and hence presses the rocking lever downwardly at an angle, the power circuit remains open and the drive motor cannot be started.

The features of having the spring element be a respective helical spring exposed to pressure and of identical spring force, which is seated in a vertical position symmetrically to the center of the rocking lever between a horizontal bottom of the guide part and an opposite end portion of the rocking lever, having the actuating pins be rigidly connected by an elongate arm placed down onto the rocking lever, and having the contact strip be of a resilient configuration at its two legs of identical length extending from the strip's central fastening point, the legs being angled downwardly somewhat in uniform fashion in the direction of the fixed contacts lend the safety device a high degree of safety on account of its stable, nonsticking and amply dimensioned configuration.

The features of having the lower edge section of the blender jug have radially and axially projecting shoulders acting as the actuating points and adapted in form and position to the position of the actuating pins, and the upper part of the base having a mount encompassing the lower edge section of the blender jug by positive engagement therewith, the mount having recesses for accommodating the projecting shoulders by positive engagement therewith, whereupon the actuating pins extend upwardly through the bores within the recesses, and the features of having the blender jug have three projecting shoulders and the base have three mating recesses enable the blender jug to be seated on the appliance base with ease, but at the same time all parts still remain fully functional if, under exceptional circumstances, the outer parts of the safety device become dirty on the outside.

The above-mentioned and further advantageous features of the invention will become further apparent from the subsequent description of a preferred embodiment of the safety device of the present invention when reading this description with reference to the accompanying drawings.

DETAILED DESCRIPTION

Figure 1B:
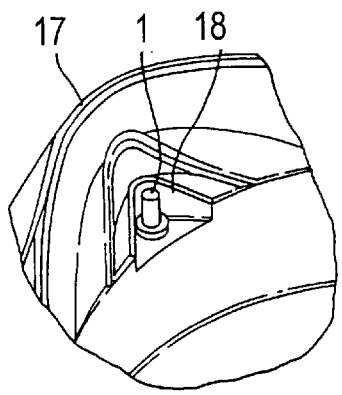
FIGS. 1A, 1B and 1C are schematic perspective views, looking from the side and from above, of an embodiment of a base, a detail view of the upper base portion marked "B" in which the position of an actuating pin is more clearly visible, and of an embodiment of a blender jug constructed in accordance with the invention, looking from below and from the side.
Figure 1A:
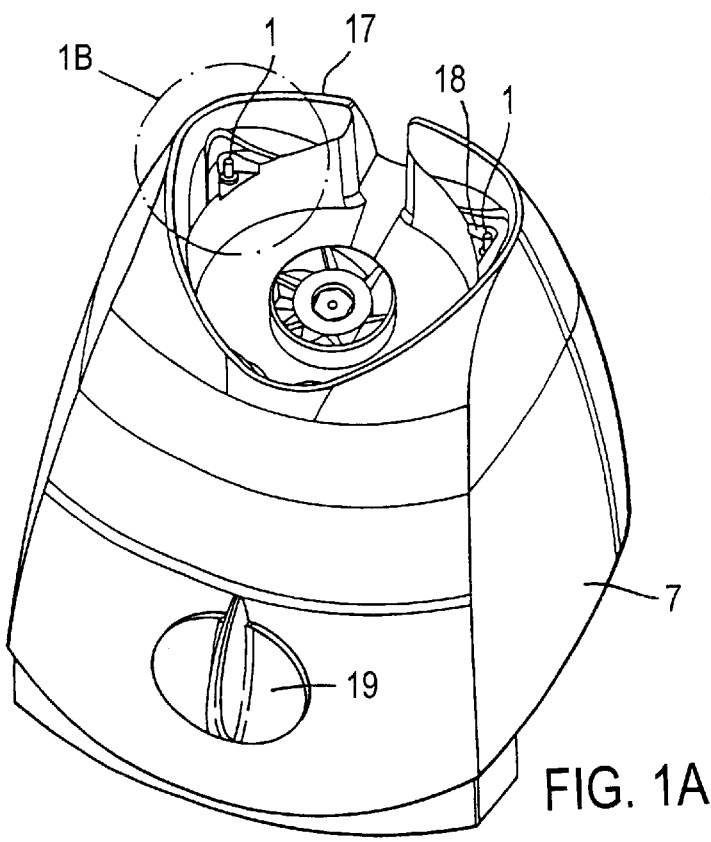
Figure 1C:
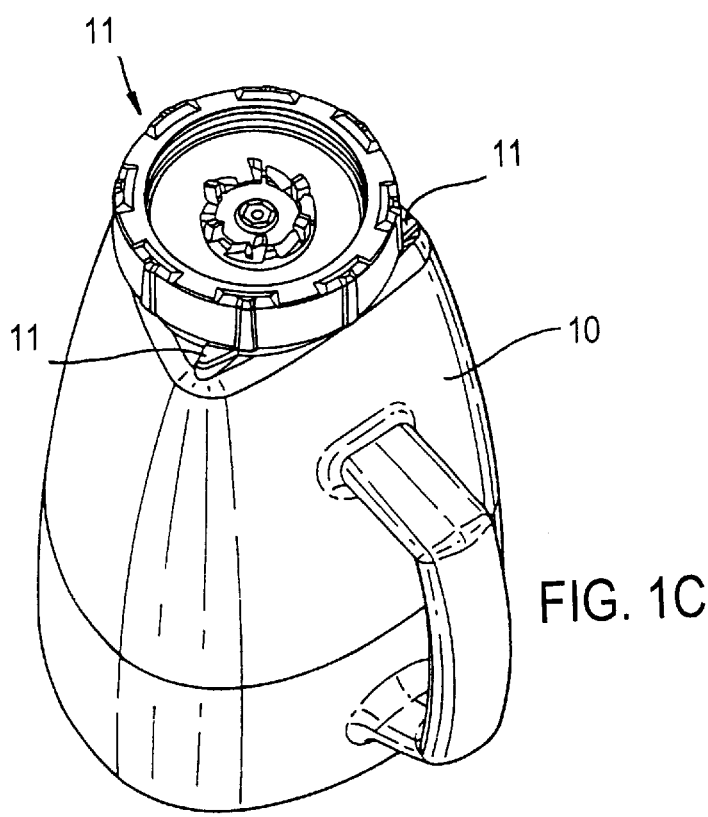

FIG. 1A is a perspective view from the side and above of a base 7 of a jug blender equipped with a safety device according to the invention, showing the blender jug 10 illustrated in FIG. 1C removed to permit a view of the actuating pins 1 projecting through a wall on the top side of the base 7. As viewed in FIG. 1A, two pins 1 are positioned at a radial distance from the drive shaft and in spaced relation to each other. The detail view of FIG. 1B clearly shows that the actuating pins 1 project within a housing recess 18 vertically movably from below through an opening in the upper housing wall of the base 7.

FIG. 1A also shows that the housing wall of the base 7 forms, in its upper area adjoining the blender jug, a mount 17 with a triangular contour with rounded corners, and has in its interior a circular mounting ring for receiving a circular mounting flange of the blender jug 10 (FIG. 1C) by frictional and positive engagement therewith.

In the blender jug 10 shown in FIG. 1C in a perspective view from below and the side, radially and axially projecting shoulders 11 serving as actuating points for the actuating pins 1 of the safety device are visible in the lower edge section and are designed such that when the blender jug 10 is properly assembled they come to rest above the actuating pins 1 shown in FIG. 1A, urging the actuating pins 1 down when the blender jug is pressed further downward. Although this cannot be seen in FIG. 1C, provision is made for three projecting shoulders 11 spaced 120° apart enabling the blender jug 10 to be push-fitted onto the base 7 in any of three possible angle positions, which ensures that two of the three projecting shoulders 11 invariably lie such that they can actuate the two actuating pins 1 of the safety device.

It should also be noted that the jug blender shown in FIG. 1A equipped with the safety device of the invention is operated in a substantially horizontal position, meaning on a kitchen table, for example, as is customary with such jug blenders. The flange-type lower edge of the blender jug 10 visible in FIG. 1C and the mounting ring of the base not illustrated in detail in FIG. 1A are constructed such that the blender jug 10 is not screwed onto the base 7 but rather push-fitted thereon by positive and frictional engagement therewith, whereupon a toothed wheel of the vertical drive shaft sitting centrally in the base 7 and driven by the drive motor, not shown, makes meshing engagement with drive teeth, shown in FIG. 1C, of the cutter wheel on the bottom side of the blender jug 10.

The construction of the safety device according to the invention will be explained in more detail in the following with reference to the partial section through the base 7 shown in FIG. 2.

The previously mentioned actuating pins 1 projecting in spaced relation to each other through bores in the wall of the base 7 are rigidly connected by an elongate plastics material arm 16 placed down onto a rocking lever 2.

As the result of its special guide and bearing arrangement the rocking lever 2 is able to execute, due to the actuating pins 1, a rocking motion in a vertical plane, e.g., amounting to some ten degrees to the left and right, combined with a sliding motion along a certain distance, e.g., some millimeters in vertical direction. This combined rocking and sliding motion of the rocking lever 2 is upwardly biased in vertical direction by a left and a right biasing spring 6. The two biasing springs 6 are helical springs of identical length and spring force, which are seated between the bottom side of the rocking lever 2 and a bottom portion of a guide part still to be described, and maintain the rocking lever 2 in a horizontal position. Mutually aligned projections or pins extending downwardly from the bottom side of the rocking lever 2 and upwardly from the top side of the bottom portion of said guide part 3 serve the function of holding the biasing springs 6. It should be noted that the terms "vertical" and "horizontal" as well as "upward" and "downward" refer to the normal working position shown in FIGS. 1 and 2 of the jug blender equipped with the safety device.

Figure 2:
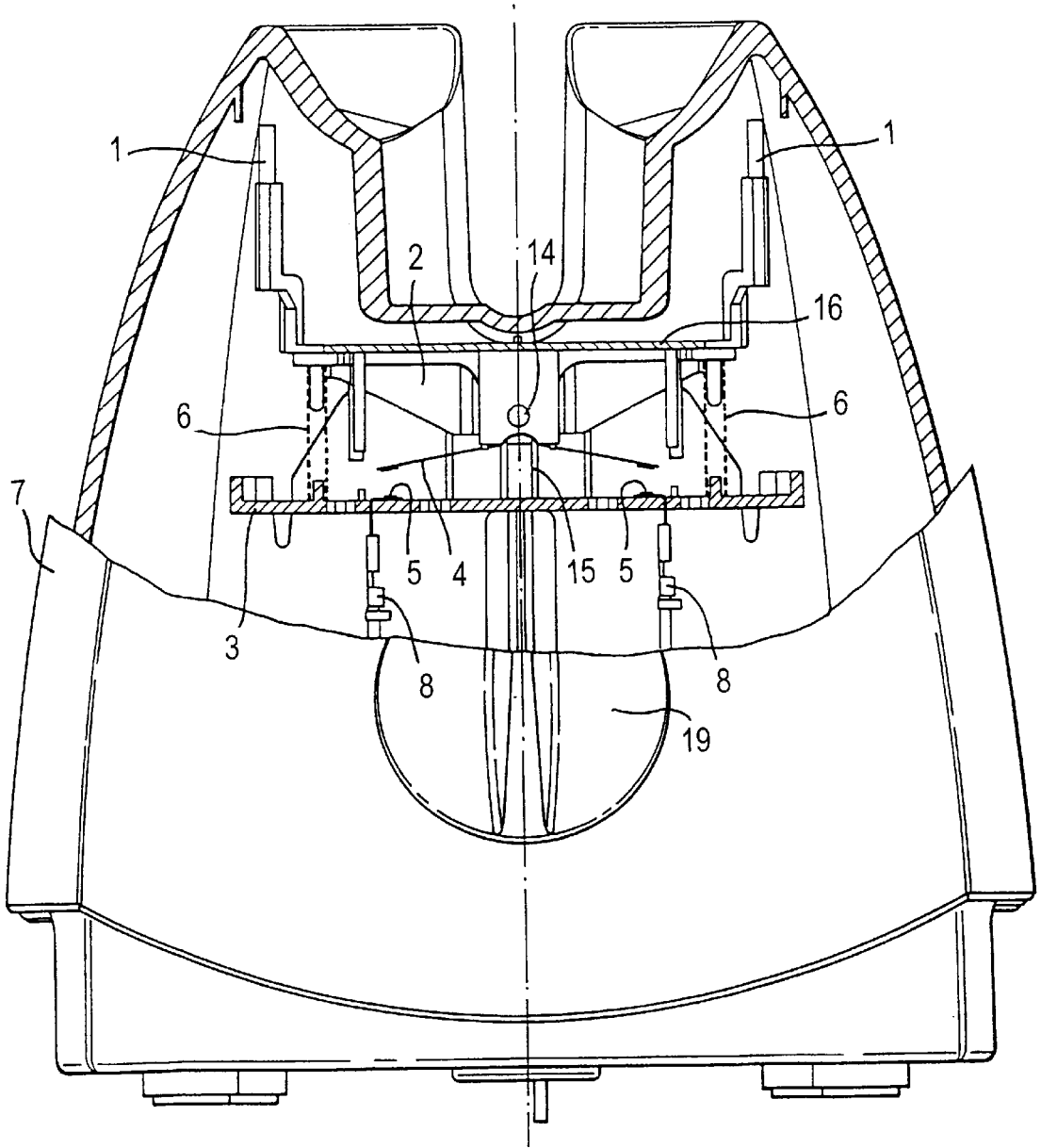
FIG. 2 is a schematic elevational and partial sectional view of an embodiment of a base constructed in accordance with the invention, with the actuating members integrated in the base.

The rocking lever 2 is symmetrically constructed in relation to a central longitudinal axis represented by a dot-and-dash line and has in its lower section, to guide its rocking motion and its sliding motion in the vertical plane, two mutually aligned, horizontally projecting guide pins 14, of which only one is shown in FIG. 2. The previously mentioned guide part 3 guiding the rocking lever 2 has two parallel walls projecting vertically upwardly from its bottom portion and, inside them, two parallel, mutually aligned vertical guide slots 15, of which likewise only one is shown in FIG. 2. The two guide pins 14 of the rocking lever 2 are guided with clearance inside these guide slots 15.

Centrally fastened to the bottom side of the rocking lever 2 is an elongate contact strip 4 of the safety switch, said strip having two legs of identical length which are resiliently constructed and downwardly bent somewhat in the direction of two individual fixed contacts 5 of the safety switch so that the movable contacts of said contact strip 4 are positioned above the individual fixed contacts 5. The fixed contacts 5 are fastened to the bottom portion of said guide part 3 and joined by connecting elements, not designated in more detail, to connecting wires 8 such that the safety switch comprised of the movable contact strip 4 and the fixed contacts 5 is in series arrangement with the manually operated main switch 19 also recognizable in FIG. 2. The actuating pins 1, the arm 16 connecting them and resting on the rocking lever 2, the rocking lever 2 and the guide part 3 can be made of insulating plastics material and be manufactured as injection moldings.

Figure 3A:
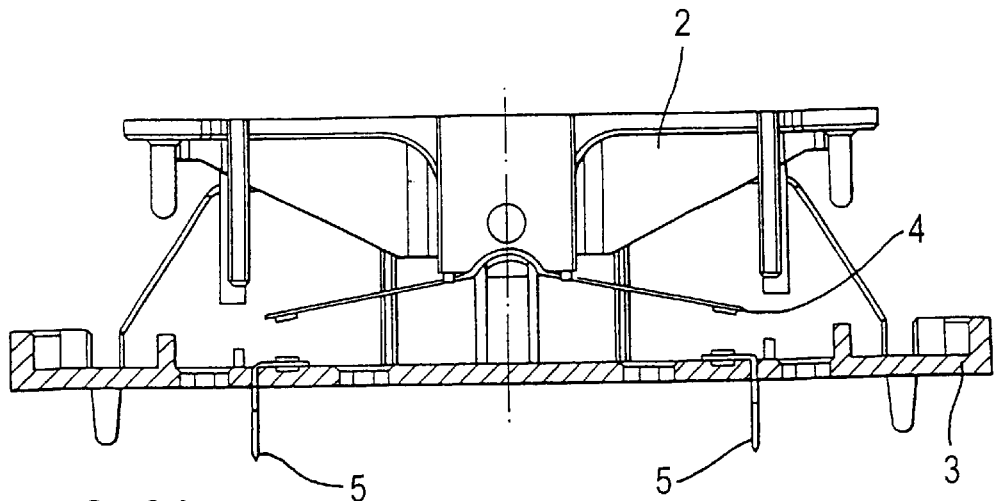
FIGS. 3A, 3B and 3C are schematic elevational views of essential parts of an embodiment of a safety device of the invention, presented in three different positions to explain their function.
Figure 3B:
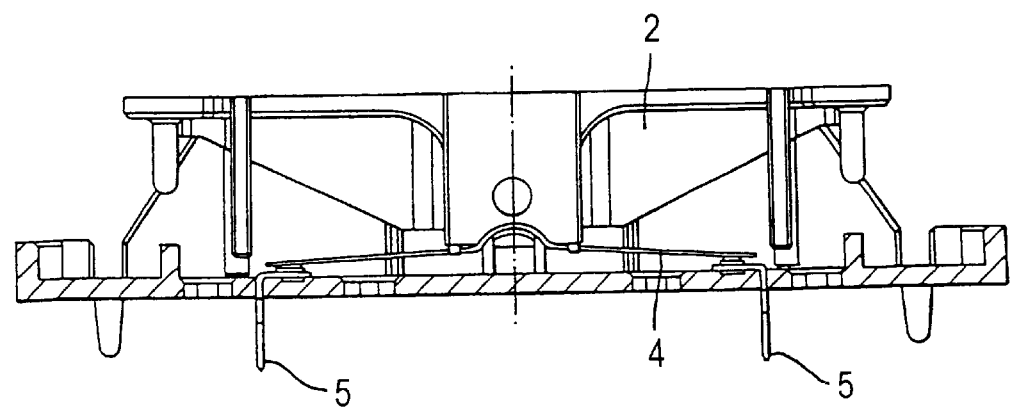
Figure 3C:
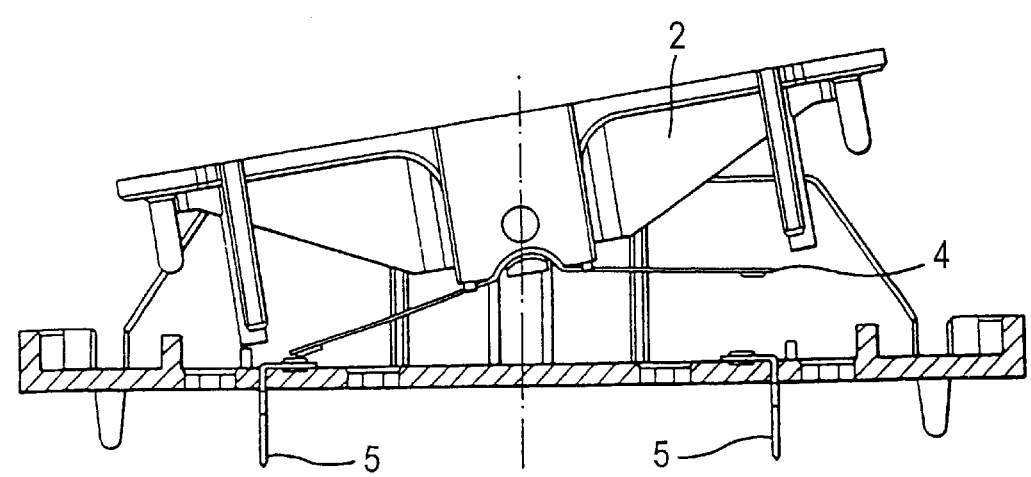

FIGS. 3A, 3B and 3C show the actuating members located inside the base 7 as well as the safety switch of the safety device of the present invention in three different positions: FIG. 3A shows the non-actuated position with the safety switch open, with the rocking lever 2 in a horizontal position due to the biasing force of the springs; FIG. 3B shows the correctly actuated position of the safety device with the safety switch closed, with the rocking lever 2 being likewise in a horizontal, but lowermost position; and finally, FIG. 3C shows the wrongly actuated position in which only one end of the contact strip 4 makes contact with one of the fixed contacts 5 so that the safety switch cannot be closed and hence the drive motor cannot be supplied with power.

In FIGS. 3A, 3B and 3C the actuating pins 1, the arm connecting them and the biasing springs 6 are omitted for the sake of simplification.

In summary, FIG. 3A shows a position of the safety device in which the blender jug 10 of the jug blender is not mounted on the base 7, as a result of which the springs (not illustrated) maintain the rocking lever 2 horizontally in an upper position. The safety switch thus remains open and the drive motor switched off. FIG. 3B shows the position of the safety device in which the blender jug 10 of the jug blender is properly mounted on the base 7 and the projecting shoulders 11 of the blender jug 10 urge the actuating pins 1 (likewise not illustrated) and hence the rocking lever 2 simultaneously and evenly horizontally downward against the biasing force of the biasing springs (not shown), causing the safety switch to be closed and enabling the drive motor to be supplied with power. FIG. 3C shows the situation when someone wrongly actuates only one actuating pin 1 and hence moves the rocking lever 2 into the tilted position shown, in which case the safety switch remains open and the motor cannot be supplied with power.

What is claimed is:

1. A jug blender comprising:
    a base with
        an electric drive motor,
        a safety switch arranged in a power supply line of the drive motor so as to disable the motor when the safety switch is open; and
        an actuating member comprising a pair of spaced apart actuating pins, the actuating member being positioned within the base and operably connected to the safety switch to close the safety switch only when the actuating pins are actuated simultaneously and evenly; and
    a blender jug adapted for seating engagement with the base, the blender jug constructed to engage both actuating pins when properly seated on the base, to close the safety switch and enable the motor.

2. The jug blender of claim 1 further comprising a manually actuated main power switch, the safety switch being arranged in series with said main power switch.

3. The jug blender of claim 1, wherein the blender jug defines a pair of spaced apart actuating points for engaging the actuating pins when the blender jug is properly seated on the base.

4. The jug blender of claim 3, wherein the base includes a guide part and the actuating member includes a rocking lever arranged for pivotal motion about a pivot and for upward and downward sliding motion along the guide part.

5. The jug blender of claim 4, wherein the rocking lever is symmetrically shaped in longitudinal direction and has in its center a guide pin perpendicular to a plane of motion of the rocking lever, the guide part having a vertical guide slot which extends parallel to the plane of motion and in which the guide pin is guided with clearance.

6. The jug blender of claim 5, wherein the rocking lever has in its center a second guide pin, the two guide pins being mutually aligned, and the guide part has two parallel vertical walls in which two mutually aligned guide slots are provided for guiding the two guide pins.

7. The jug blender of claim 4 further comprising a guide part fastened within the base, wherein
    the base includes an upper wall defining a pair of spaced apart bores arranged to receive said pair of actuating pins,
    the actuating member includes an elongate, normally horizontally extending rocking lever made of an insulating material and a spring element, said rocking lever being positioned between said pair of actuating pins and actuatable at each of its two ends by a respective one of said pair of actuating pins, said actuating pins being movable vertically downwardly within said pair of bores in the upper wall of the base by pressure from the actuating points of the blender jug when the blender jug is properly mounted on the base, a vertical downward movement of the actuating pins causing the rocking lever to execute a rocking motion within a predetermined angle in a vertical plane combined with a vertical sliding motion by a predetermined distance, the rocking lever being centrally guided in said guide part while being at the same time elastically biased toward the blender jug by said spring element, and wherein the safety switch comprises
        an elongate, electrically conducting contact strip having a pair of contacts, one located at each end, the contact strip being movable with the rocking lever and fixed centrally to a side of the rocking lever facing away from the actuating pins, and
        two individual fixed contacts fastened to the base at a location opposite the contacts of the contact strip, so that the contacts of the contact strip can only be closed with the fixed contacts and power be supplied to the drive motor when both actuating pins are urged simultaneously and evenly to move the rocking lever and the connected movable contact strip against the biasing force of the spring element horizontally downwardly into engagement with the two fixed contacts of the safety switch.

8. The jug blender of claim 7, wherein the guide part has a horizontal bottom and the actuating member includes a first and a second spring element, each spring element being a helical spring of identical spring force, the first and the second spring elements being seated in a vertical position symmetrically about the center of the rocking lever between said horizontal bottom of the guide part and one of opposite end portions of the rocking lever.

9. The jug blender of claim 7, wherein the actuating pins are rigidly connected by an elongate arm placed down onto the rocking lever.

10. The jug blender of claim 7, wherein the contact strip includes two legs of identical length extending from a central fastening point, said legs being of a resilient configuration and angled downwardly toward the fixed contacts in substantially uniform fashion.

11. The jug blender of claim 7, wherein a lower edge section of the blender jug has radially and axially projecting shoulders acting as the actuating points and adapted in form and position to correspond with the actuating pins, and an upper part of the base has a mount for encompassing the lower edge section of the blender jug by positive engagement therewith, said mount having recesses for accommodating the projecting shoulders by positive engagement therewith, each of the pair of actuating pins extending upwardly through one of the pair of bores in the upper wall of the base within one of said recesses.

12. The jug blender of claim 11, wherein the blender jug has three projecting shoulders and the base has three of said recesses for accommodating the projecting shoulders.

13. The jug blender as claimed in claim 4, wherein the actuating member and the guide part are each injection molded of plastics material.

* * * * *